July 21, 1959

E. G. NEWSOM ET AL

2,896,074

FREQUENCY TRACKER WITH FIXEDLY-SPACED LOCAL OSCILLATIONS EQUALLY OFFSET FROM UNKNOWN FREQUENCY

Filed July 31, 1953

INVENTORS
EARL G. NEWSOM
WILBUR J. HUNTINGTON
BY

ATTORNEY

2,896,074

FREQUENCY TRACKER WITH FIXEDLY-SPACED LOCAL OSCILLATIONS EQUALLY OFFSET FROM UNKNOWN FREQUENCY

Earl G. Newsom, Thornwood, and Wilbur J. Huntington, White Plains, N.Y., assignors to General Precision Laboratory Incorporated, a corporation of New York Application July 31, 1953, Serial No. 371,608

20 Claims. (Cl. 250—20)

This invention relates in general to frequency trackers and more particularly to a frequency tracker for detecting and measuring the mid frequency of a narrow band of frequencies mixed with broad band noise.

A frequecy tracker is an apparatus which is required to accept an input signal and deliver an output indicative of the frequency of the input signal. The output may, for example, be in the form of a visual indication, a shaft rotation equal or proportional to the frequency, an A.C. or D.C. voltage the magnitude of which is proportional to frequency, or a noise-free A.C. voltage the frequency of which is equal or proportional to the input frequency. The signal input may be a single frequency but more frequently comprises a relatively narrow band of frequencies in which case the mean or average frequency must be measured. The input signal may be continuously varying in frequency over a considerable range, in some cases over a range of 10 or 20 to 1. The input signal may be barely discernible above the noise level, and may even disappear for a time. Despite this, a frequency tracker is required to search for the signal, detect it, follow its fluctuations in frequency, and measure is frequency with a high degree of accuracy.

A frequency tracker as above described has a number of useful applications. A navigation system employing the Doppler principle requires a frequency tracker to measure the frequency of the Doppler shifted returned signal. Some absolute altimeters measure altitude as a function of frequency and therefore require a frequency tracker. A radio transmitter whose frequency is continuously varied could be followed with a frequency tracker.

It is an object of this invention to provide a frequency tracker which will follow the frequency variations of an input signal and measure its frequency continuously.

Another object of this invention is to provide a frequency tracker with provisions for searching over a wide band of frequencies to locate an input signal.

Another object of this invention is to provide a frequency tracker which will operate satisfactorily with an input signal having a low signal to noise ratio.

Another object of this invention is to provide a frequency tracker which will measure the frequency of an input signal with great accuracy.

In accordance with the invention, the input signal is fed to a modulator where it is mixed with a locally generated signal. This locally generated signal consists alternately of one or the other of two alternating voltages equal in magnitude but differing in frequency. Switching between the two voltages is at a rate low compared to their frequencies and to the frequency of the input signal. At balance, the frequencies of the two voltages lie equally above and below that of the input signal and the output of the modulator consists of a voltage whose frequency is the difference between that of the input signal and that of the locally generated voltages. When unbalanced, the modulator output consists of a voltage which shifts abruptly in frequency at the rate at which the locally generated signal is switched. The modulator output is passed through a low pass filter and a demodulator, and is then phase detected in synchronism with the switching frequency. The output of the phase detector, which is a direct voltage the polarity and magnitude of which are indicative of the sense and magnitude of unbalance, is applied to an integrating amplifier which, in turn, controls the frequencies of the locally generated signal voltages. Both the output of the integrating amplifier and the mean frequency of the locally generated voltages are measures of the frequency of the input signal.

For a more complete understanding of the invention, reference may be made to the accompanying drawing, in which.

Figure 1:
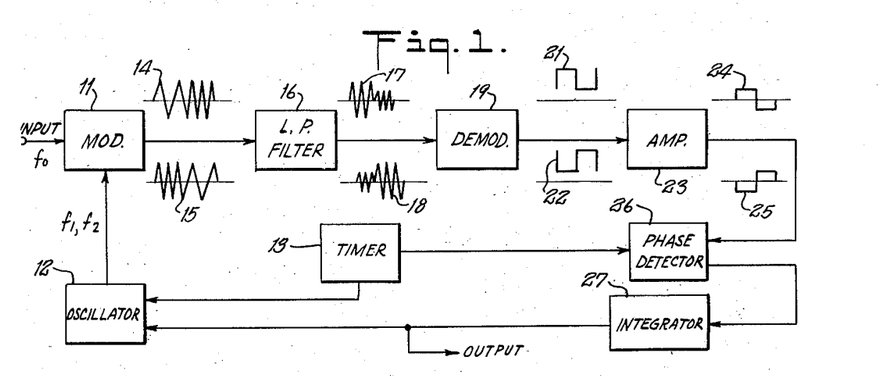
Figure 1 is a block diagram of one embodiment of the invention.

Referring first to Fig. 1, the input signal having a frequency designated by $f_0$ is shown applied to a modulator 11. An oscillator 12 is provided which generates a voltage which is switched between the two frequencies $f_1$ and $f_2$ in response to a signal from a timer 13. The mean frequency $f_m$ of the oscillator is within the range of variations of the input signal and is equal thereto when the apparatus is in a balanced condition. The output of the oscillator is fed to the modulator 11 where it is mixed with the input signal. If balanced, the output of the modulator 11 is a single band of frequencies $f_0 - f_1 = f_2 - f_0$. If the mean frequency $f_m$ of the oscillator is different from the input signal, then $f_0 - f_1$ is different from $f_2 - f_0$ and the output of the modulator 11 consists alternately of two different frequencies.

In Fig. 1, there are shown sketches of the waveforms appearing at various portions of the circuit which will be more fully described as respective portions of the circuit are described. The waveforms above and below represent conditions of unbalance when the mean frequency $f_m$ is, respectively, above and and below that of the input signal $f_0$.

The timer 13 has two positions and when in its position A, the oscillator generates a frequency lower than when in position B. If $f_m$ is above $f_0$, then the output of the modulator 11 consists of a voltage having a low frequency when the timer is in position A and a high frequency when the timer is in position B as shown by the waveform 14. If the mean frequency $f_m$ is below $f_0$ then the output of the modulator 11 will consist of a high frequency when the timer is in position A and a low frequency when the timer is in position B as indicated by the waveform 15. The output of modulator 11 is passed through a low-pass filter 16 which is designed so as to attenuate the higher frequency more than the lower frequency. The waveform of the output of the low-pass filter 16 is indicated by the by the curves 17 and 18 when $f_m$ is higher and lower respectively than $f_0$. The signal is next passed through a demodulator 19 where the envelope of the input waveform is derived as shown by curves 21 and 22. These signals are substantially square waves whose instantaneous values are always positive. The signals are next passed through an amplifier 23 where their magnitude is increased and the zero reference axis changed so that the output is a square wave extending equally above and below the zero axis and the phase of which depends upon whether $f_m$ is greater or less than $f_0$, as shown by the waveforms 24 and 25.

The output of the amplifier 23 is fed to phase detector 26 which operates in synchronism with the timer 13 so that the output is a direct voltage, the polarity and magnitude of which are representative of the sense and magnitude of the deviation of $f_m$ from $f_0$. This output is passed through an integrator 27, the output of which is proportional to the time integral of the input. The output of integrator 27 controls the frequency of the oscillator 12. The output of the integrator and the mean frequency of oscillator 12 are both indicative of the frequency of the input signal $f_0$.

Figure 2:
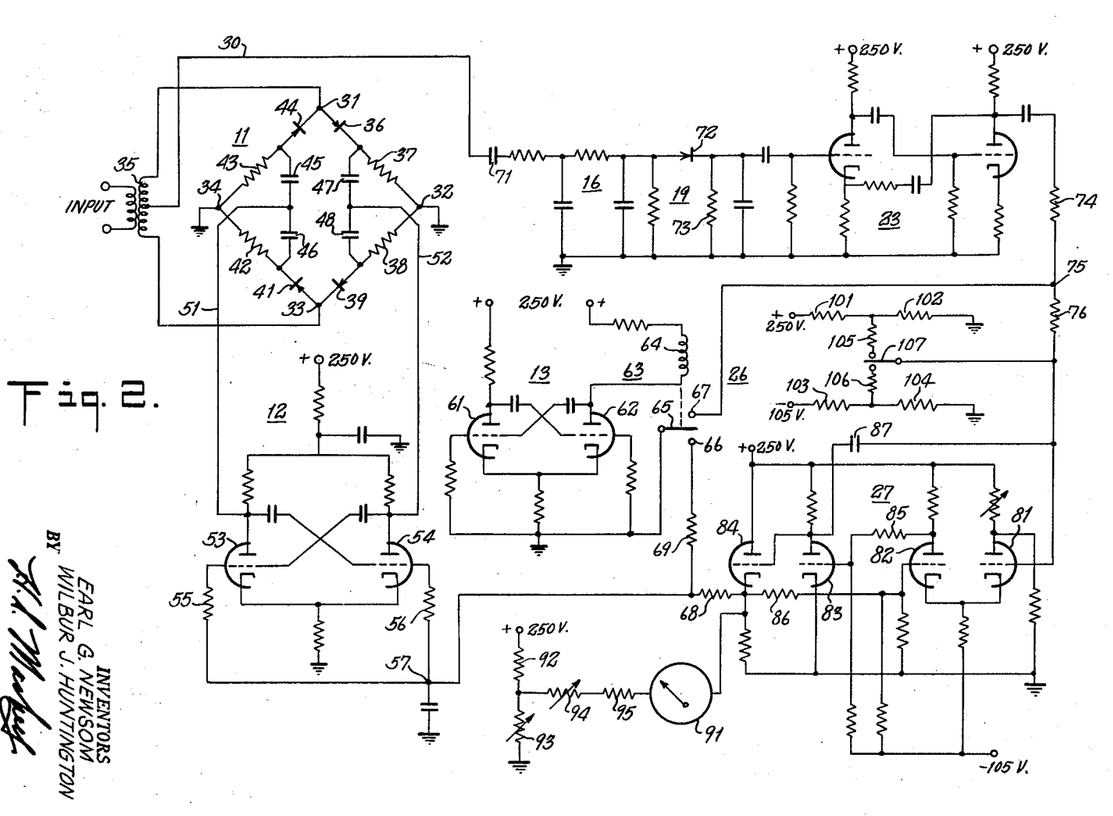
Figure 2 is a schematic diagram of the embodiment of Fig. 1.

For a more detailed description of the frequency tracker of Fig. 1, reference may be made to Fig. 2. The modulator 11 comprises a bridge circuit having four junctions 31, 32, 33, and 34 and a modulation transformer 35. The signal input is connected to the primary of the transformer and opposite ends of the secondary are connected to opposite junctions 31 and 33 of the bridge circuit. The output of the modulator is taken from the midpoint of the secondary of transformer 35 via conductor 30. Starting from junction 31, the first arm of the bridge circuit comprises a rectifier 36 and a resistor 37 connected in series to junction 32, which is grounded. The second arm, between junctions 32 and 33, comprises a resistor 38 connected to junction 32 and to a rectifier 39 which is, in turn, connected to junction 33. The third arm, between junctions 33 and 34, comprises a rectifier 41 connected to junction 33 and to a resistor 42 which is, in turn, connected to junction 34, which is grounded. The fourth arm, between junctions 34 and 31, comprises a resistor 43 connected to a rectifier 44, which, in turn, is connected to the junction 31. The rectifiers are poled so that the same polarity of current can flow from junction 31 to junction 32, from junction 32 to junction 33, from junction 33 to junction 34, and from junction 34 to junction 31.

Two capacitors 45 and 46 are connected in series between the junction of resistor 43 and rectifier 44, and the junction of rectifier 41 and resistor 42. The junction of the capacitors 45 and 46 is connected through conductor 51 to one output terminal of the oscillator 12. Two capacitors 47 and 48 are connected in series between the junction of rectifier 36 and resistor 37 and the junction of resistor 38 and rectifier 39. The junction of the capacitors 47 and 48 is connected through conductor 52 to the other output terminal of oscillator 12.

The oscillator 12 is a free running multivibrator comprising triode sections 53 and 54 which generate square wave voltages of opposite phase at the anodes of the two sections. The grids are returned through resistors 55 and 56 to a common point 57 so that the frequency of the multivibrator can be controlled by adjusting the grid bias.

The modulator 11, in effect, takes the input signal and multiplies it successively by $+1$ and $-1$ for equal periods of time at a cyclic rate equal to the frequency of the oscillator 12. It can be shown schematically that the multiplication of a sine wave by a symmetrical square wave yields an output containing the sum and difference frequencies, along with higher frequency terms, but neither original frequency. The multiplication takes place as follows. When conductor 51 is positive and conductor 52 negative, rectifiers 44 and 36 pass current, thus clamping junction 31 to ground potential. Junction 33 is free to vary in potential, and follows the input wave, one half of this potential appearing on conductor 30. When conductor 52 is positive and conductor 51 negative, junction 33 is clamped to ground and the potential of junction 31 is the input wave potential, reversed in polarity. One half of this potential appears on conductor 30. Therefore, the potential on conductor 30 is the input signal multiplied successively by $+k/2$ and $-k/2$, where $k$ is the turns ratio of the transformer 35.

Switching of the frequency of oscillator 12 from $f_1$ to $f_2$ is accomplished by means of the timer 13. Timer 13 comprises a pair of triode sections 61 and 62 connected as a free running multivibrator. The frequency of the multivibrator is not critical, but should be low, on the order of 1 to 30 cycles per second. In an actual embodiment, 2 cycles per second has been found satisfactory. A relay 63 has its operating winding 64 in the anode circuit of triode section 62. Relay 63 includes an armature 65 and two stationary contacts 66 and 67. It is apparent from the drawing that the armature 65 will alternately make contact with stationary contacts 66 and 76 at the frequency of the multivibrator.

The potential of the common terminal 57 controls the frequency of oscillator 12. Terminal 57 is connected through a resistor 68 to the cathode of triode section 84 constituting the output of the integrator 27. Terminal 57 is also connected through a resistor 69 to the contact 66 of relay 63. When the armature 65 is in its upper position, the potential of terminal 57 is controlled by the potential of the cathode of triode section 84. When armature 65 is in its lower position, the contact 66 is grounded thus decreasing the potential of point 57 and decreasing the frequency of oscillator 12. The various circuit parameters are selected so that the grounding of contact 66 decreases the frequency by approximately 10%.

The output of modulator 11 is led by means of conductor 30 through a capacitor 71 to the low-pass filter 16. The cutoff frequency is not critical, and a filter whose response is 3 db down at 150 cycles has been found satisfactory.

When the mean frequency $f_m$ of the oscillator 12 is different from the frequency of the input signal, the output of filter 16 varies in magnitude at the timing frequency as shown by the waveforms 17 and 18 of Fig. 1. The envelope is recovered by passing the signal through demodulator 19 which comprises a rectifier 72 and a load resistor 73.

The square wave voltage across load resistor 73, illustrated by the waveforms 21 and 22 of Fig. 1, is passed through an amplifier 23 where it is increased in amplitude and centered about the zero voltage reference line, as shown by waveforms 24 and 25 in Fig. 1.

The output of amplifier 23 is passed through resistor 74, junction point 75, and resistor 76 to the grid of a triode section 81 constituting the input of the integrator 27. The phase detector 26 of Fig. 1 comprises the armature 65 and fixed contact 67 of the relay 63. It will be recalled that the cyclic operation of relay 63 determines the rate at which the frequency of oscillator 12 is switched and therefore determines the frequency of the square wave output of the amplifier 23. The armature 65 is grounded, while the fixed contact 67 is connected to the junction point 75. The armature 65 therefore makes contact with the fixed contact 67 on alternate half cycles of the output wave from amplifier 23 thus grounding junction 75 during these alternate half cycles. When the armature 65 leaves contact 67, the junction 75 is free to assume any potential dictated by the output of the amplifier 23. It follows that the potential of junction 75, which is the input to the integrator 27, comprises a series of direct voltage pulses the polarity and magnitude of which are indicative of the sense and extent of the deviation in frequency between the mean oscillator frequency $f_m$ and the input signal frequency $f_0$.

The junction 75 is connected through a resistor 76 to the grid of triode section 81 of the integrator 27. The integrator 27 is a high gain direct coupled amplifier comprising triode sections 81, 82, 83 and 84. The grid of section 81 is cathode coupled to section 82. Section 82 is resistor coupled, through resistor 85, to section 83, which, in turn, is directly coupled to section 84, the latter being connected as a cathode follower. A resistor 86 is connected between the cathode of section 84 and the grid of section 82 to provide the positive feedback necessary to achieve very high gain. A feedback condenser 87 connected between the anode of section 83 and the grid of section 81 completes the integrator. Integrators of the general class of integrator 27 are often referred to as "feed-back time constant" circuits or as "Miller feedback" circuits. The output is taken from the cathode of the section 84 and connected through a resistor 68 to the control terminal 57 of the oscillator 12. This output is very nearly the time integral of the input at terminal 75.

The potential of the cathode of triode section 84 is indicative of the mean frequency of the oscillator 12 and of the frequency of the input signal. A visual indication of this frequency may readily be obtained by means of a microammeter 91 connected between the cathode of section 84 and a voltage divider comprising resistors 92 and 93 connected across a positive voltage supply. Series resistors 94 and 95 may be included in series with meter 91. Two of the resistors, such as 93 and 94, may be made adjustable for calibrating meter 91.

The apparatus so far described operates as explained in connection with Fig. 1. If the mean frequency, $f_m$, of oscillator 12 is greater than the frequency of the input signal, $f_o$, then the input to the integrator at junction 75 will be a positive voltage. The cathode of triode section 84 will decrease in potential as long as terminal 75 is positive. The decrease in potential of the cathode of section 84 will decrease the frequency of the oscillator 12 until its mean frequency, $f_m$, is equal to the input frequency, $f_o$. At this time the output of amplifier 23 will disappear and the input to the integrator will be zero. As long as the input is zero, the output potential of the integrator will remain constant at the potential which is attained at the moment the input potential became zero.

It can be seen that the foregoing operation can occur only if the mean frequency, $f_m$, of oscillator 12 is reasonably close to the input frequency. When the apparatus is first turned on, $f_m$ and $f_o$ will usually be widely separated. It is also possible for the input signal to disappear entirely for a time and to reappear at some widely separated frequency. Therefore, it is necessary to provide some means to locate the signal initially, after which the apparatus will follow it. To this end there are provided two voltage dividers, the first comprising resistors 101 and 102 serially connected between a source of positive voltage and ground, and the second comprising resistors 103 and 104 serially connected between a source of negative voltage and ground. The junction of resistors 101 and 102 is connected through a large resistor 105 to one fixed contact of a single pole double throw switch 107 while the junction of resistors 103 and 104 is connected through another large resistor 106 to the other fixed contact of switch 107. The movable arm of the switch is connected to the grid of triode section 81. The switch 107 may conveniently be spring biased to its mid position where neither contact is made. When in its upper position, the integrator input is positive, and the output of the integrator will slowly decrease thereby decreasing the frequency of oscillator 12 to its lower limit. When the switch 107 is in its lower position, the frequency of oscillator 12 will be slowly swept to its upper extreme. To search for a signal, the switch is held first in one position, then in the other position, while the meter 91 is watched. If an input signal is present, the meter will come to rest when the frequency of oscillator 12 reaches the input frequency. This will occur because resistors 105 and 106 are very much larger than resistors 74 and 76, so that an output from amplifier 23 will override the bias applied through switch 107. Once the input signal is located, the apparatus will "lock on" to it and meter 91 will give a continuous indication of its frequency.

The embodiment of Figs. 1 and 2 is a very simple frequency tracker. The rectifiers 36, 39, 41 and 44 in the modulator 11 may be germanium diodes while the rectifier 72 of the demodulator 19 may be a selenium rectifier. Only five small vacuum tubes are required, not including the power supply. A model built according to Fig. 2 has been found capable of tracking an input signal varying from 1 to 16 kilocycles and of measuring its frequency with an accuracy of approximately 2%.

In some applications an accuracy greater than that obtainable with the embodiment of Figs. 1 and 2 is required. For such applications, a number of refinements can be made as illustrated in the embodiment of Figs. 3 and 4.

Figure 3:
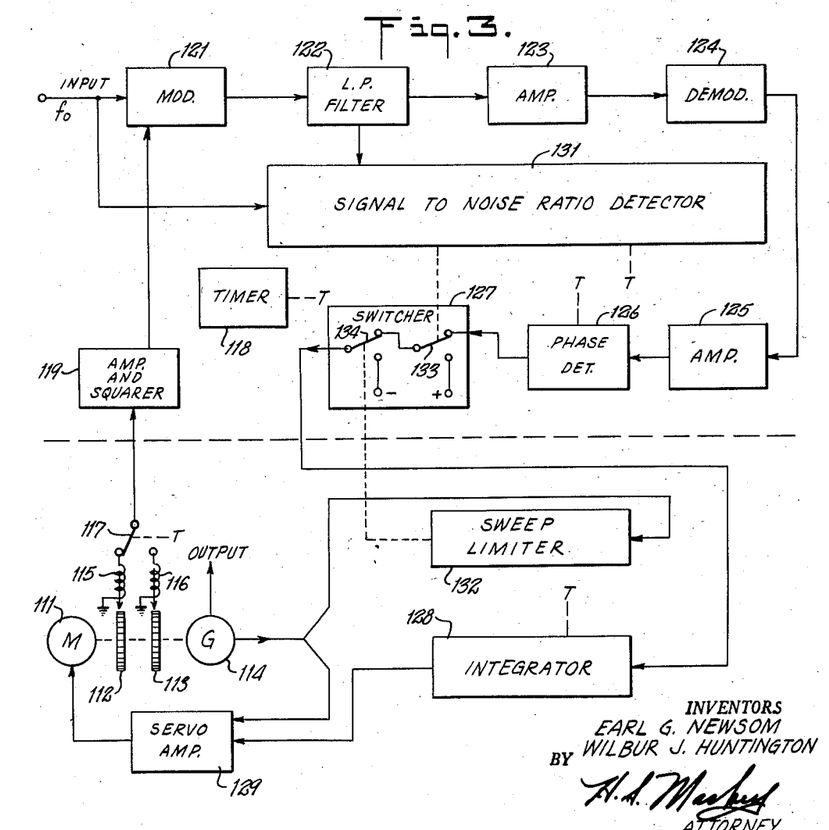
Figure 3 is a block diagram of another embodiment of the invention.

In Fig. 3 there is shown a motor 111 which drives two tone wheels 112 and 113 and a tachometer generator 114. Associated with the tone wheels 112 and 113 are electromagnetic pickups 115 and 116 respectively, in which voltages proportional to the speed of rotation are induced. The wheels 112 and 113 have different numbers of teeth so that the voltages induced in pickups 115 and 116 differ from each other in frequency by approximately 10%. The switch 117 selects one or the other of these two voltages at a cyclic rate in response to a signal from the timer 118.

Figure 4A:
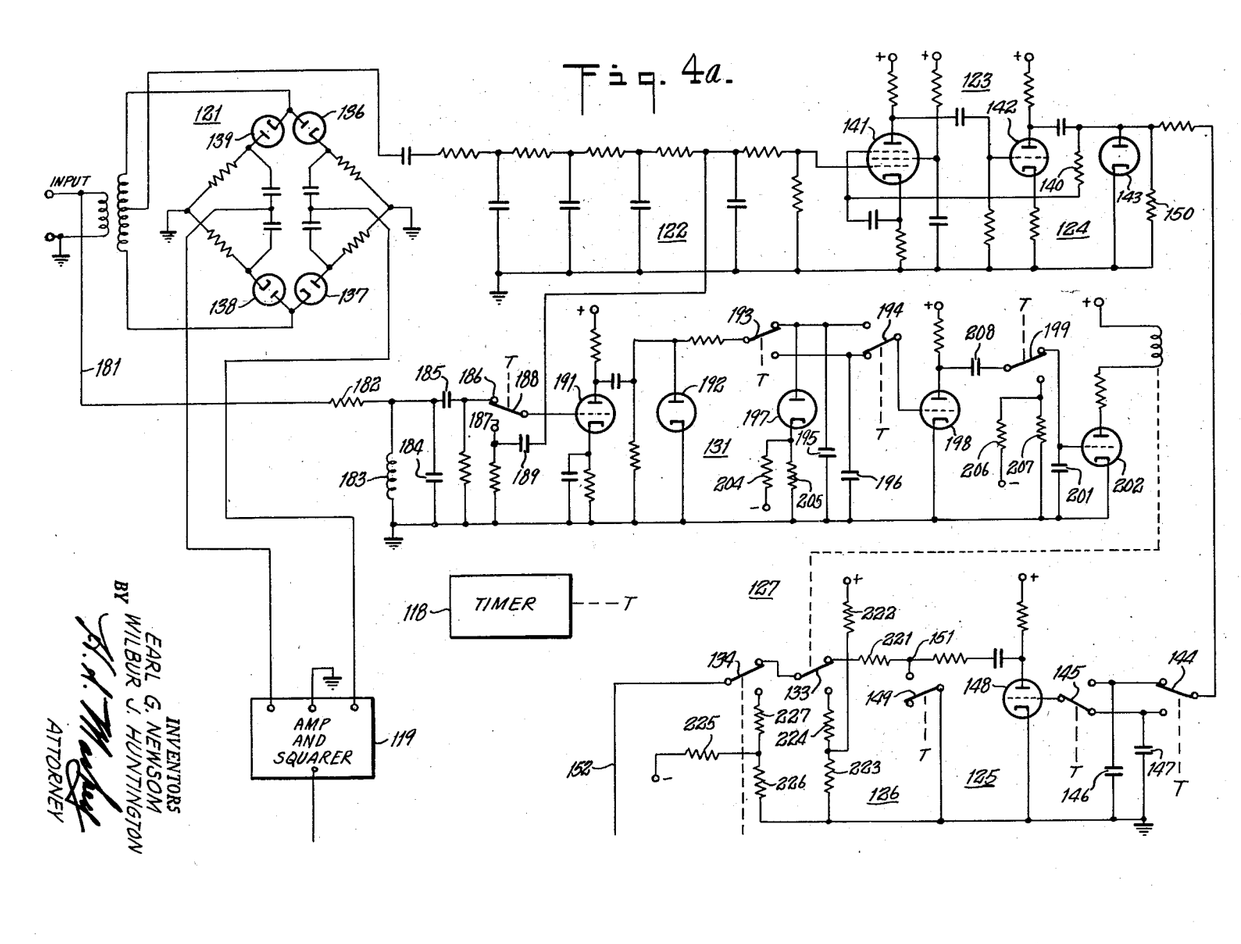
Figures 4a and 4b, taken together, comprise a schematic diagram of the embodiment of Fig. 3.
Figure 4B:
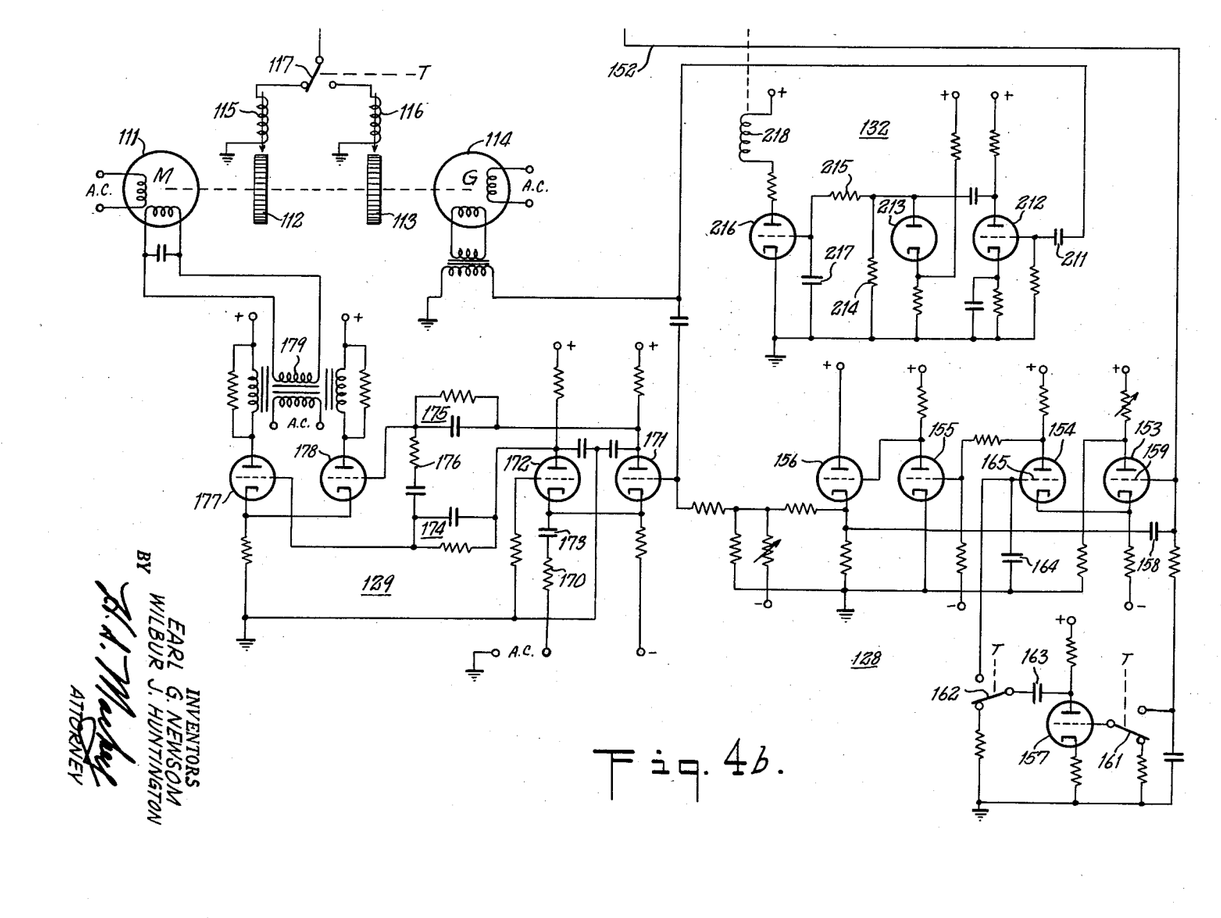

It will be noted that various portions of the apparatus in Figs. 3 and 4 have a dashed line leading to the letter T. This is intended to indicate a mechanical connection to the timer 118, so that all of the various items so indicated are operated synchronously by the timer 118.

The voltage selected by the switch 117 is led to an amplifier 119 which accepts the sine wave input, amplifies it, and converts it to a square wave of constant amplitude having a push-pull output. This output is fed to a modulator 121 where it is mixed with the input signal. The output of the modulator is passed successively through a low-pass filter 122, a gain control amplifier 123, a demodulator 124, an amplifier 125, a phase detector 126, a switcher 127 and is then applied to the input of an integrator 128. The components just listed operate in a manner similar to those described in connection with Fig. 1. However, the output of the integrator 128 is utilized in a little different manner to control the frequency of the signals generated by tone wheels 112 and 113 and pickups 115 and 116.

The tachometer generator 114 is a generator, the output of which has a constant frequency and the amplitude of which is proportional to its speed of rotation. The output of generator 114 and the output of integrator 128 are both applied to a servo amplifier 129 which compares the peak amplitude of the output of generator 114 with the direct current output of the integrator 128 to secure an error signal. This error signal is amplified and applied to the motor 111 in the proper sense to adjust its speed until the error signal is reduced to zero.

So far no mention has been made of the signal to noise ratio detector 131, or the sweep limiter 132 and it has been assumed that the switches 133 and 134 were in their upper positions as shown in the drawing so that the output from the phase detector 126 was led directly to the integrator 128. As previously pointed out, the input signal is frequently mixed with random noise and may at times be completely obscured. Therefore, it is necessary to provide some means for seeking out the signal should it become lost for any reason. This operation is accomplished by the signal to noise ratio detector 131 and the sweep limiter 132. The signal to noise ratio detector 131 secures a signal directly from the input which is representative of the noise level. A second signal is secured from the low-pass filter 122 which is representative of signal and noise. These two signals are compared and if the signal to noise ratio becomes too low, the switch 133 is operated to its lower position. This operation places a positive voltage on the input to the integrator 128, which causes its output to decrease thereby reducing the speed of motor 111 and reducing the magnitude of the output of generator 114, and, of course, reducing the frequency of the signals induced in pickups 115 and 116. When the frequency of these signals has fallen below the range of input signals for which the apparatus is designed, the output of generator 114 will be sufficiently reduced to cause the sweep limiter 132 to operate the switch 134 to its lower position. The input to integrator 128 is now negative and the motor speed will be increased to its upper limit thereby increasing the frequency of the voltages induced in pickups 115 and 116 to their upper limits. When these upper limits are reached, the sweep limiter will return the switch 124 to its upper position thereby again placing a positive voltage on the input to the integrator 128. This sweeping will continue until a usable signal is again detected, when the signal to noise ratio detector will return switch 133 to its upper position and the apparatus will track the newly found signal.

For a more detailed description of the embodiment of the invention of Fig. 3, reference may be made to Figs. 4a and 4b. The various elements are shown in approximately the same relative positions in both the block diagram of Fig. 3 and the schematic diagram of Figs. 4a and 4b.

Referring first to Fig. 4a, the input signal the frequency of which is to be tracked and measured is applied to modulator 121 where it is mixed with the voltages from the amplifier and squarer 119. Modulator 121 is the same as modulator 11 of Fig. 2 except that it is preferred to use vacuum tube diodes 136, 137, 138 and 139 instead of germanium diodes. The operation is the same as that of modulator 11. The output of modulator 121 is led to the low-pass filter 122 which is somewhat more elaborate than filter 16 of Fig. 2. The cutoff frequency is not critical and a filter whose response is down 3 db at 150 cycles has been found to be satisfactory. The output of filter 122 is passed through an amplifier 123 comprising a pentode 141 and triode 142. The envelope of the output of amplifier 123 is secured by a demodulator 124 which comprises a vacuum tube diode 143 and a load resistor 150. The potential of the anode of diode 143 also serves as a source of automatic gain control voltage for the amplifier 123. A portion of this voltage is applied, via the resistor 140, to the suppressor of pentode 141.

The output of diode 143, which is a square wave plus noise, is led to a relay section comprising switches 144 and 145 which are operated cyclically by the timer 118. During one half of the cycle the switch 144 applies the signal to a capacitor 146. During the other half cycle, the signal is applied to a capacitor 147. Since the phase of the error signal and the operation of switches 144 and 145 are synchronized, the signal being dealt with during each half cycle of switching is a D.C. voltage with noise superimposed on it. Thus, the square wave error signal is converted into two D.C. voltages, and, by making the time constant fairly long, the D.C. voltages become reasonably true averages of the half cycle demodulator output. When the demodulator output is switched to either capacitor, that capacitor forms part of a low-pass filter which attenuates the noise but retains the D.C. voltage. With the switch 144 in the other position, the capacitor maintains across it the voltage which was last applied. The switch 145 is out of phase with the switch 144 so that when switch 144 is applying the signal to capacitor 146, the switch 145 is sampling the voltage of capacitor 147. The arm of switch 145 is never directly connected to the arm of switch 144. Thus, the signal to noise ratio is greatly improved and a considerable gain may be applied to the square wave to produce high sensitivity and a high degree of tracking accuracy.

The signal from the arm of switch 145 is passed through amplifier 125, comprising a triode 148, to the phase detector 126. The phase detector 126 comprises a switch 149 operated in synchronism with the square wave signal by the timer 118. During one half of each cycle the signal is grounded by the switch 149. During the remaining half of each cycle the potential of the point 151 is free to assume any value dictated by the signal. Therefore, the potential of point 151 comprises a series of direct voltage pulses, the polarity and magnitude of which are indicative of the sense and extent of the deviation of $f_m$ from $f_0$.

Assuming for the moment that switches 133 and 134 are in their upper positions as shown in Fig. 4a, the output of the phase detector 126 is passed via conductor 152 to the integrator 128 (see Fig. 4b). Integrator 128 comprises a direct coupled differential stage employing triodes 153 and 154, an amplifier stage triode 155, a cathode follower output triode 156, and a drift correcting triode 157. Neglecting for the moment the function of the drift correcting triode 157, the direct current signal from the phase detector is applied through conductor 152 to the grid of triode 153 resulting in an amplified signal of like polarity being applied to the grid of triode 155. The output from the anode of triode 155 is applied to the grid of cathode follower triode 156, from which the output is taken. Integration occurs through the Miller negative feedback action of a relatively large capacitor 158 connected between the cathode of triode 156 and the grid of triode 153. As a result, the output is proportional to the time integral of the input, rather than to the input itself.

Integrator 128, being a direct coupled amplifier, is subject to zero drift which would introduce an appreciable error unless some means for compensating were provided. The drift correcting circuit including triode 157 is similar to that described in the copending application of John W. Gray, Serial No. 212,949, entitled "Stabilized Direct Coupled Amplifier." Briefly stated, the circuit comprises synchronously actuated switches 161 and 162 which may be actuated by the timer 118. Switch 161 alternately applies the potential of the grid 159 of input triode 153 and ground potential to the grid of triode 157. Any deviation of the potential of grid 159 from ground will place an A.C. potential on the grid of tube 157 which is amplified and synchronously detected by the switch 162. The resulting D.C. potential is applied, through the voltage divider action of capacitors 163 and 164, to the grid 165 of tube 154 so as to place grid 165 at the same magnitude of D.C. potential but of opposite polarity, as the grid 159, thus compensating for zero drift.

It will be recalled from the discussion in connection with Fig. 3, that the two electromagnetic pickups, 115 and 116, have induced in them voltages whose frequencies, $f_1$ and $f_2$, differ by approximately 10%. It is $f_m$, the mean of these frequencies, which is made equal to the frequency $f_0$ of the input signal. When $f_m$ is equal to $f_0$, there will be no output from the demodulator 124 (Figs. 3 and 4a), and consequently the input to the integrator 128 (Figs. 3 and 4b) will be zero. Stated another way, the input to the integrator 128 is an error signal indicative of the difference between $f_m$ and $f_0$. However, the output of integrator 128 is not an error signal, but is a D.C. voltage indicative of the frequency $f_0$ of the input signal.

It will also be recalled from the discussion in connection with Fig. 3 that the output of the generator 114 is an A.C. voltage of constant frequency whose magnitude is proportional to the speed of rotation of its shaft and therefore proportional to $f_m$. It follows that the difference between the D.C. voltage output of the integrator 128 and the A.C. voltage output of tachometer generator 114 can be made to constitute an error signal and to control the speed of the motor 111. The comparison and control are accomplished by servo amplifier 129.

Servo amplifier 129 (Fig. 4b) comprises two triode sections 171 and 172 whose cathodes are joined and coupled to a source of alternating current through a resistor 170 and a capacitor 173. The alternating current source is the same as that used to excite generator 114 so that it has the same frequency and the values of resistor 170 and capacitor 173 are selected to make the A.C. applied to grid and cathode exactly in phase. The parameters of the circuit are selected so that the A.C. voltage cuts off both triode sections 171 and 172 for approximately 350 degrees of the A.C. cycle, allowing conduction only during negative peaks. The output of integrator 128 and the output of generator 114 are both applied to the grid of triode section 171. If the negative peak of the tachometer voltage is not equal to the D.C. output of the integrator, the voltage existing on the grid of section 171 during the conductive period will be amplified and appear on the anodes of sections 171 and 172 as a push-pull error signal. This error signal is led, via stabilizing RC networks 174, 175 and 176, to the grids of triode sections 177 and 178 which operate as a differential amplifier. The output of the sections operates, through a magnetic amplifier 179, to control the speed of motor 111 in a well known manner.

The purpose of amplifier 119 (Fig. 4a) is to convert the sine wave input of varying amplitude into a square wave of constant amplitude. This amplifier has not been described in detail since it may comprise well known circuits to obtain a well known result.

The timer 118 may take many different forms, it merely being required to operate the various switches at a uniform rate. The frequency of operation is not critical, but should be low compared to the lowest frequency of input signal expected. A frequency of two c.p.s. has been found to be satisfactory. In an embodiment actually constructed, a free running multivibrator having a frequency of 4 c.p.s. is used to trigger a flip-flop circuit once each cycle, resulting in a 2 c.p.s. square wave at one anode of the flip-flop circuit. A relay in this anode circuit may energize the operating windings of one or more additional relays which operate the various switches.

The signal to noise ratio detector 131 causes the apparatus to search for the signal when the signal to noise ratio becomes too low. The input signal is led via conductor 181 (Fig. 4a) through a resistor 182. A band pass filter comprising an inductance 183 and a capacitor 184 is tuned to some frequency above that of any expected input signal. The apparatus illustrated is designed for an input signal varying from one to sixteen kilocycles, and the filter is tuned to eighteen kilocycles, and has a bandwith of 150 cycles at the 3 db points. The output of the filter is coupled by a capacitor 185 to one fixed contact 186 of a switch 188, operated cyclically by the timer 118. The other fixed contact 187 of the switch is coupled by a capacitor 189 to the output of the low-pass filter 122. The contact 186 has impressed on it a voltage representing the amplitude of the noise level only, while the contact 187 receives a potential representing the amplitude of signal plus noise. The cyclic operation of the switch 188 applies these potentials alternately to the grid of an amplifying triode 191. Assuming that the amplitude of the signal-plus-noise is greater than the amplitude of the noise, the output of the triode 191 will be an alternating current the amplitude of which shifts abruptly up and down at the frequency of the timer 118. The envelope of the output of triode 191 is a square wave the amplitude of which is indicative of the amount by which signal-plus-noise exceeds noise. This envelope is recovered by means of a demodulating diode 192 and an electromechanical filter comprising switches 193 and 194, and capacitors 195 and 196. This filter is similar to that previously described comprising switches 144 and 145, and capacitors 146 and 147. During one half of the cycle, the switch 193 applies the noise voltage to capacitor 195 while switch 194 samples the voltage of capacitor 196. During the other half cycle, the switch 193 applies the signal-plus-noise voltage to capacitor 196 while the switch 194 samples the voltage of capacitor 195. Neglecting for the moment the function of the diode 197, the output of the filter is a square wave, always negative with respect to ground, the amplitude being indicative of the signal to noise ratio. This square wave is amplified by the triode 198 and led through a switch 199, operated by the timer 118, to a capacitor 201. The switch 199 applies the positive half cycles of the square wave to the capacitor 201, which is also connected to the grid of a triode 202. The anode circuit of triode 202 includes a solenoid 203 which operates the switch 133 in the switcher 127. The positive charge built up on capacitor 201 maintains triode 202 normally conductive so that the solenoid 203 holds the switch 133 in the position illustrated in the drawing. If the level of the signal-plus-noise signal from the low-pass filter 122 falls compared to the level of the noise signal from the band pass filter 183—184, the switch 188 will apply signals of nearly the same amplitude to the triode 191. The envelope of the output of triode 191 will rise and fall very little and the square wave recovered by the demodulating diode 192 will have a small amplitude. Consequently the output of triode 198 will be smaller, as will the positive pulses applied to capacitor 201. The conductivity of triode 202 will therefore be reduced, reducing the current through solenoid 203 and allowing switch 133 to fall to its lower position. As previously explained, this puts a positive voltage on the integrator input causing the speed of motor 111 to be reduced.

The output of the amplifier and squarer 119, being a square wave, contains not only the fundamental, but harmonics also. It is conceivable that some harmonic, for example the third, might be of sufficient amplitude to mix with the input signal and cause the frequency tracker to "lock on" to this harmonic. Then, of course, the motor 111 would run at one-third its proper speed. It is also possible for the input signal to contain a harmonic of sufficient amplitude to mix with the output of the amplifier 119 and cause the frequency tracker to "lock on" to this harmonic of the input signal. These undesirable modes of operation are more likely to occur when the noise level is low. When the noise level is high, only the fundamentals have sufficient amplitude to operate the apparatus. To guard against "locking on" to harmonics, the noise voltage which is compared to the signal-plus-noise voltage is not allowed to fall below a predetermined value. This is accomplished by means of the diode 197 and the voltage divider comprising resistors 206 and 207.

The anode of the diode 197 is connected to the capacitor 195 which, it will be recalled, receives the portions of the output voltage of demodulator tube 192 which represent the level of the noise signal. The cathode of diode 197 is connected to the junction of resistors 204 and 205 which form a voltage divider between a source of negative voltage and ground. The values of resistors 204 and 205 are selected so that the cathode of diode 197 is maintained a few volts below ground potential. This insures that the potential of the anode of diode 197 cannot rise above the potential of the cathode, or, in other words, it sets the minimum charge of capacitor 195. This allows the potential of capacitor 195 to be controlled by the level of the noise signal, subject to the limitation that it cannot become more positive than the cathode of diode 197. The effect is as if the noise signal were not allowed to fall below a predetermined level.

A voltage divider comprising resistors 206 and 207 is connected between a source of negative voltage and ground. The values of resistors 206 and 207 are selected so that their junction is a few volts negative.

The switch 199 applies that half of the square wave which represents the signal level to the capacitor 201. This portion of the square wave is, in general, positive when the signal voltage exceeds the noise voltage. During the remaining half cycle, the switch 199 connects the coupling capacitor 208 to the junction of the voltage divider, thus establishing a reference level to the square wave output which is sufficiently negative to cut off triode 202 in the absence of a signal.

When the signal to noise ratio detector 131 operates switch 133, the motor speed is reduced and the frequency of the voltages induced in pickups 115 and 116 is reduced to a value below that of the range of expected input signals for which the frequency tracker is designed. Some provision must be made for raising these frequencies to their upper limit so that the input signal may be found. The sweep limiter 132 (Fig. 4b) serves this purpose. The output of the tachometer generator 114 is coupled by a capacitor 211 to the grid of a triode amplifier 212. The amplified A.C. voltage is partially rectified by a diode 213, the cathode of which is biased a few volts positive. The output at the anode of diode 213 consisting of the clipped positive portion of the A.C. voltage and the entire negative portion appears across a load resistor 214. This output is led through a resistor 215 to the grid of a triode 216. A capacitor 217 is connected between the grid of triode 216 and ground. The capacitor 217 starts to charge alternately to the positive voltage to which the cathode of diode 213 is biased and to the peak negative value of the amplified tachometer voltage. The negative peak is normally large enough to predominate, and maintains triode 216 cut off. The solenoid 218 in the anode circuit remains deenergized, and the switch 134 (Fig. 4a) remains in its upper position, as illustrated. It will be recalled that the output of tachometer generator 114 is a voltage of constant frequency the magnitude of which is proportional to its speed of rotation. When the speed of the motor 111 falls to its lower limit, the magnitude of the voltage output of generator 114 will fall accordingly. This reduces the negative peaks applied to capacitor 217, allowing the grid voltage of triode 216 to rise until triode 216 conducts sufficiently to energize the solenoid 218 and operate the switch 134 to its lower position. This applies a large negative voltage to the input to the integrator 128, which in turn causes the motor 111 to increase its speed rapidly to its upper limit.

The output of the phase detector 126 appearing at the junction point 151 is normally applied to the integrator through a large resistor 221, which may have a value on the order of twenty megohms. This large resistor, together with the feedback capacitor 158 in the integrator, smooths out the rapid and erratic fluctuations of the input signal. When the signal to noise ratio detector operates the switch 133, the positive voltage obtained from the voltage divider comprising resistors 222 and 223 is applied to the integrator through a much smaller resistor 224, which may have a value on the order of two megohms. It is apparent that the integrator will act much faster with this low resistor, and will reduce the speed of the motor 111 to its lower limit comparatively quickly. When the sweep limiter 132 operates switch 134, a negative voltage obtained from the voltage divider comprising resistors 225 and 226 is applied to the integrator through a small resistor 227, which may have a value on the order of fifteen thousand ohms. This causes the motor 111 to speed up very quickly, so that the frequency of the voltages induced in pick-ups 115 and 116 may be said to "fly back" to their upper limit. The capacitor 217 in the sweep limiter 132 will hold its charge long enough to prevent the triode 216 from being cut off before the motor 111 has reached its maximum speed. Soon thereafter, however, a negative charge will build up on capacitor 217, cutting off triode 216, and returning switch 134 to its upper position. The positive bias will then be applied to the integrator 128 through resistor 224 and switch 133, causing the frequencies induced in pick-ups 115 and 116 to be "swept" to their lower limit. This "sweeping" and "fly-back" action will continue until the input signal is found, when normal operation will be resumed.

A model in accordance with Figs. 4a and 4b has been constructed to track and measure input signals varying from 1 to 16 kilocycles. It has proved to be capable of operating with a low signal to noise ratio and of measuring the input frequency with an error of less than 1/10 of 1% of itself.

The invention has been described with respect to two preferred embodiments. However, many modifications may be made within the scope of the invention. For example, all of the cyclically operated switches have been shown as being operated at the same frequency. This has been done for convenience only. The switches 117, 144 and 145 and 149 must be operated synchronously with each other. Switches 161 and 162 must be operated synchronously with each other. Switches 188, 193, 194 and 199 must be operated synchronously with each other. However, each of these three groups may be operated asynchronously with each other. Many of the circuits illustrated in detail may be modified or replaced by other circuits as dictated by engineering requirements as to frequency range, accuracy required, weight, bulk, power consumption, cost, etc.

What is claimed is:

1. A frequency tracker comprising, an input circuit connected to a modulator, automatic means for alternately and cyclically impressing upon said modulator two alternating voltages of different frequencies and means synchronized with said automatic means and responsive to the output of said modulator for controlling the frequencies of said alternating voltages.

2. A frequency tracker for measuring the frequency of an input signal comprising, a modulator, means for impressing the input signal on said modulator, automatic means for alternately and cyclically impressing upon said modulator two alternating voltages of different frequencies, and means synchronized with said automatic means and responsive to the output of said modulator for simultaneously adjusting the frequencies of said two alternating voltages so that their mean frequency is equal to the frequency of said input signal.

3. A frequency tracker comprising, an input circuit connected to a modulator, means for cyclically impressing upon said modulator first one and then the other of two alternating voltages of different frequencies, a low-pass filter connected to the output of said modulator and means responsive to the output of said low-pass filter and synchronized with the cyclic impression of said two voltages upon said modulator for controlling the frequencies of said alternating voltages.

4. A frequency tracker comprising an input circuit connected to a modulator, automatic means for cyclically impressing upon said modulator first one and then the other of two alternating voltages of different frequencies, a low-pass filter connected to the output of said modulator, demodulating means for recovering the envelope of the output of said low-pass filter and means responsive to the output of said demodulating means and synchronized with said automatic means for controlling the frequencies of said alternating voltages.

5. A frequency tracker for measuring the frequency of an input signal comprising, a modulator, means for impressing the input signal upon said modulator, automatic means for alternately impressing upon said modulator two alternating voltages of different frequencies, a low-pass filter connected to the output of said modulator, demodulating means for rectifying the output of said low-pass filter, a phase detector synchronized with said atomatic means and connected to the output of said demodulating means for securing an output, the polarity of which depends upon the phase of the output of said demodulating means, and means responsive to the output of said phase detector for simultaneously controlling the frequencies of said alternating voltages.

6. A frequency tracker for measuring the frequency of an input signal comprising, a modulator, means for impressing the input signal upon said modulator, automatic means for alternately impressing upon said modulator two alternating voltages of different frequencies, a low-pass filter connected to the output of said modulator, demodulating means for rectifying the output of said low-pass filter, a phase detector synchronized with said automatic means and connected to the output of said demodulating means for securing an output, the polarity of which depends upon the phase of the output of said demodulating means, an integrating circuit connected to the output of said phase detector for securing a voltage proportional to the time integral of the voltage output of said phase detector, and means responsive to the output of said integrating circuit for adjusting the mean frequency of said alternating voltages to equal the frequency of said input signal.

7. A frequency tracker for detecting and measuring an input signal consisting of a fluctuating narrow band of frequencies comprising a modulator, means for applying said input signal to said modulator, means for alternately impressing upon said modulator two alternating voltages of different frequencies, a low-pass filter connected to the output of said modulator, means for detecting the output of said filter synchronously with the alternate impression of alternating voltages on said modulator and means responsive to the output of said detecting means for controlling the frequencies of said alternating voltages.

8. A frequency tracker for seeking, detecting, following and measuring an input signal consisting of a fluctuating narrow band of frequencies comprising, a modulator, means for applying said input signal to said modulator, means for alternately impressing upon said modulator two alternating voltages of different frequencies, means responsive to the output of said modulator for simultaneously adjusting the frequencies of said two alternating voltages so that their mean frequency is equal to the frequency of said input signal, and auxiliary means for increasing and decreasing the frequency of said alternating voltages to seek out the input signal.

9. A frequency tracker for seeking, detecting, following and measuring an input signal consisting of a fluctuating narrow band of frequencies comprising, a modulator, means for applying said input signal to said modulator, means for alternately impressing upon said modulator two alternating voltages of different frequencies, a low-pass filter connected to the output of the said modulator, a demodulator for rectifying the output of said low-pass filter, a phase detector connected to the output of said demodulator for obtaining an output voltage, the polarity of which depends upon the phase of the output of said demodulator, an integrating circuit connected to the output of said phase detector for deriving a voltage proportional to the time integral of said phase detector output, means responsive to the output of said integrating circuit for simultaneously adjusting the frequency of said two alternating voltages until their mean frequency is equal to the frequency of said input signal, and auxiliary means for applying alternately a positive and a negative potential to the input of said integrating circuit to alternately decrease and increase the frequencies of said alternating voltages.

10. A frequency tracker comprising, an input circuit connected to a modulator, a multivibrator having its output connected to said modulator, timing means for cyclically shifting the bias on said multivibrator to shift its frequency, and means synchronized by said timing means and responsive to the output of said modulator for controlling the mean frequency of said multivibrator.

11. A frequency tracker for detecting and measuring an input signal consisting of a fluctuating narrow band of frequencies comprising, a modulator, a multivibrator the output of which is connected to said modulator, timing means for cyclically shifting the bias on said multivibrator to alter its frequency, a low-pass filter connected to the output of said modulator, means controlled by said timing means for detecting the output of said filter synchronously with the shifting of bias on said multivibrator, and means responsive to the output of said detecting means for controlling the mean frequency of said multivibrator.

12. A frequency tracker comprising, an input circuit connected to a modulator, a multivibrator having its output connected to said modulator, timing means for cyclically shifting the bias on said multivibrator to shift its frequency, means responsive to the output of said modulator for controlling the mean frequency of said multivibrator, and auxiliary means for selectively increasing or decreasing the positive bias on said multivibrator to sweep its frequency between its upper and lower limits.

13. A frequency tracker for detecting and measuring an input signal consisting of a fluctuating narrow band of frequencies comprising, a modulator, a multivibrator the output of which is connected to said modulator, timing means for cyclically shifting the bias on said multivibrator to alter its frequency, a low-pass filter connected to the output of said modulator, means controlled by said timing means for detecting the output of said filter synchronously with the shifting of bias on said multivibrator, means responsive to the output of said detecting means for controlling the mean frequency of said multivibrator, and auxiliary means for selectively increasing or decreasing the positive bias on said multivibrator to sweep its frequency between its upper and lower limits.

14. A frequency tracker comprising an input circuit connected to a modulator, two metallic toothed wheels having different numbers of teeth on their periphery and mounted on a common shaft driven by a motor, an electromagnetic pickup associated with each wheel, timing means for cyclically selecting the output of one or the other of said pickups, means for applying a signal derived from the outputs of said pickups to said modulator, and means controlled by said timing means and responsive to the output of said modulator for controlling the speed of said motor and the frequencies of the voltages induced in said pickups.

15. A frequency tracker for detecting and measuring an input signal consisting of a fluctuating narrow band of frequencies, comprising, a modulator, means for applying said input signal to said modulator, two metallic toothed wheels having different numbers of teeth on their peripheries and mounted for rotation on a common shaft driven by a motor, an electromagnetic pickup magnetically associated with each wheel, timing means for cyclically selecting the output of one or the other of said pickups, means for applying a signal derived from the outputs of said pickups to said modulator, a low-pass filter connected to the output of said modulator, means controlled by said timing means for detecting the output of said filter synchronously with the selection of outputs from said pickups, and means responsive to the output of said detecting means for controlling the speed of said motor and the frequencies of the voltages induced in said pickups.

16. A frequency tracker for measuring the frequency of an input signal comprising, a modulator, means for impressing the input signal upon said modulator, two metallic toothed wheels having different numbers of teeth on their peripheries and mounted for rotation on a common shaft driven by a motor, an electro-magnetic pickup inductively associated with each wheel, timing means for cyclically selecting the output of one or the other of said pickups, means for applying a signal derived from the outputs of said pickups to said modulator, a low-pass filter connected to the output of said modulator, demodulating means for rectifying the output of said low-pass filter, a phase detector controlled by said timing means connected to the output of said demodulating means for securing an output the polarity of which depends upon the phase of the output of said demodulating means, an integrating circuit connected to the output of said phase detector for securing a voltage proportional to the time integral of the voltage output of said phase detector, a generator mounted on said common shaft having an output which is an alternating current whose magnitude is proportional to the speed of rotation of said shaft, and means responsive to the difference between the peak amplitude of the output of said generator and the output of said integrating circuit for controlling the speed of said motor to adjust the mean of the frequencies of the voltages induced in said pickups to equal the frequency of said input signal.

17. A frequency tracker for measuring the frequency of an input signal comprising, a modulator, means for impressing the input signal on said modulator, means for alternately impressing upon said modulator two alternating voltages of different frequencies, means normally responsive to the output of said modulator for controlling the frequencies of said alternating voltages, and auxiliary means responsive to a low signal to noise ratio for disabling said normally responsive means and for sweeping the frequencies of said alternating voltages between their upper and lower limits.

18. A frequency tracker comprising, an input circuit connected to a modulator, means for alternately impressing upon said modulator two alternating voltages of different frequencies, a low-pass filter connected to the output of said modulator, means normally responsive to the output of said low-pass filter for controlling the frequencies of said alternating voltages, auxiliary means connected to said input circuit and to said low-pass filter for comparing the signal and the noise amplitude, and switch means operated by said auxiliary means for disabling said normal responsive means and for sweeping the frequencies of said alternating voltages between their upper and lower limits.

19. Apparatus for producing a voltage the magnitude and polarity of which depend upon the extent and sign of the difference between the frequency of an input signal and the mean frequency of a pair of reference voltages comprising, a modulator, means for impressing the input signal on said modulator, means for alternately impressing said reference voltages on said modulator, a low-pass filter connected to the output of said modulator, demodulating means for rectifying the output of said low-pass filter, and means for detecting the output of said demodulating means synchronously with the alternate impression of said reference voltages on said modulator.

20. Apparatus for producing a direct voltage the magnitude and polarity of which are indicative of the extent and sign of the difference in frequency between that of a first alternating voltage and that of the mean of the frequencies of second and third alternating voltages comprising, a codulator, means for impressing said first voltage on said modulator, means for alternately impressing said second and third voltages on said modulator, a low-pass filter connected to the output of said modulator, demodulating means for rectifying the output of said filter, and a phase detector connected to the output of said demodulating means, said phase detector being operated in synchronism with the alternate impression of said second and third voltages on said modulator.

References Cited in the file of this patent

UNITED STATES PATENTS

| | | |
|---|---|---|
| 2,338,395 | Bartelink | Jan. 4, 1944 |
| 2,417,286 | Bartels | Mar. 11, 1947 |
| 2,425,981 | Bard | Aug. 19, 1947 |
| 2,570,013 | Van Hardenberg | Oct. 2, 1951 |
| 2,588,742 | McCallum | Mar. 11, 1952 |
| 2,640,155 | Rambo | May 26, 1953 |